United States Patent
Kim et al.

(10) Patent No.: US 10,659,232 B2
(45) Date of Patent: May 19, 2020

(54) MESSAGE AUTHENTICATION APPARATUS AND METHOD BASED ON PUBLIC-KEY CRYPTOSYSTEMS

(71) Applicants: ICTK Holdings Co., Ltd., Seongnam-si (KR); IUCF-HYU (INDUSTRY-UNIVERSITY COOPERATION FOUNDATION HANYANG UNIVERSITY), Seoul (KR)

(72) Inventors: Dong Kyue Kim, Seoul (KR); Byong Deok Choi, Seoul (KR); Dong Hyun Kim, Gyeonggi-do (KR); Sang Seon Park, Gyeonggi-do (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 463 days.

(21) Appl. No.: 15/302,947

(22) PCT Filed: Apr. 9, 2015

(86) PCT No.: PCT/KR2015/003576
§ 371 (c)(1),
(2) Date: Dec. 23, 2016

(87) PCT Pub. No.: WO2015/156621
PCT Pub. Date: Oct. 15, 2016

(65) Prior Publication Data
US 2017/0187537 A1 Jun. 29, 2017

(30) Foreign Application Priority Data

Apr. 9, 2014 (KR) .................. 10-2014-0042360
Apr. 9, 2015 (KR) .................. 10-2015-0050155

(51) Int. Cl.
*H04L 9/32* (2006.01)
*H04L 9/08* (2006.01)
(Continued)

(52) U.S. Cl.
CPC .......... *H04L 9/3249* (2013.01); *H04L 9/0866* (2013.01); *H04L 9/0869* (2013.01);
(Continued)

(58) Field of Classification Search
None
See application file for complete search history.

(56) References Cited

U.S. PATENT DOCUMENTS

2002/0007453 A1* 1/2002 Nemovicher .......... H04L 51/30
713/155
2002/0061186 A1* 5/2002 Nonomura ............... G09B 5/02
386/241
(Continued)

FOREIGN PATENT DOCUMENTS

CN 101411117 A 4/2009
CN 102439897 A 5/2012
(Continued)

OTHER PUBLICATIONS

Menezes, A. et al., "Handbook of Applied Cryptography: Table of Contents," Available Online at http://cacr.uwaterloo.ca/hac/about/toc3.pdf, Aug. 31, 2001, 9 pages.
(Continued)

*Primary Examiner* — William J. Goodchild
(74) *Attorney, Agent, or Firm* — McCoy Russell LLP

(57) ABSTRACT

Disclosed is an authentication apparatus using a public key encryption algorithm. An apparatus according to an embodiment generates a first instant public key through a random number generation process in response to an electronic signature generation request corresponding to a message.
(Continued)

Further, the apparatus calculates and uses a first instant private key making a pair with the first instant public key, using the first instant public key.

15 Claims, 4 Drawing Sheets

(51) Int. Cl.
  *H04L 9/30* (2006.01)
  *H04L 9/14* (2006.01)
  *H04L 29/06* (2006.01)
(52) U.S. Cl.
  CPC .............. *H04L 9/14* (2013.01); *H04L 9/30* (2013.01); *H04L 9/302* (2013.01); *H04L 9/3278* (2013.01); *H04L 63/08* (2013.01)

(56) References Cited

U.S. PATENT DOCUMENTS

| | | | |
|---|---|---|---|
| 2003/0044014 A1* | 3/2003 | Liardet | G06F 7/38 380/268 |
| 2005/0066009 A1* | 3/2005 | Keohane | H04L 51/24 709/207 |
| 2005/0084114 A1 | 4/2005 | Jung et al. | |
| 2008/0008316 A1 | 1/2008 | Pilipchuk | |
| 2008/0279373 A1* | 11/2008 | Erhart | H04L 9/302 380/46 |
| 2009/0003597 A1* | 1/2009 | Gantman | H04L 9/3013 380/44 |
| 2011/0002461 A1 | 1/2011 | Erhart et al. | |
| 2011/0103589 A1 | 5/2011 | Tie et al. | |
| 2011/0246765 A1* | 10/2011 | Schibuk | H04L 63/0428 713/158 |
| 2011/0246783 A1* | 10/2011 | Unagami | G06F 21/556 713/187 |
| 2011/0274277 A1* | 11/2011 | Hennebert | H04L 1/1671 380/273 |
| 2012/0321077 A1 | 12/2012 | Shiota et al. | |
| 2013/0254636 A1 | 9/2013 | Kirkpatrick et al. | |
| 2013/0304779 A1* | 11/2013 | Lu | H04L 9/3033 708/250 |

FOREIGN PATENT DOCUMENTS

| | | |
|---|---|---|
| CN | 102843231 A | 12/2012 |
| EP | 0368596 A2 | 5/1990 |
| KR | 1020050102291 A | 10/2005 |
| KR | 1020090017538 A | 2/2009 |
| KR | 101139630 B1 | 5/2012 |

OTHER PUBLICATIONS

European Patent Office, Extended European Search Report Issued in Application No. 15776257.6, Oct. 2, 2017, Germany, 7 pages.
Shinde, G. et al., "Faster RSA Algorithm for Decryption Using Chinese Remainder Theorem," International Conference on Computational & Experimental Engineering and Sciences Online Version, vol. 5. No. 4, Available Online at http://www.techscience.com/doi/10.3970/icces.2008.005.255.html, Available as Early as Jan. 1, 2008, 8 pages.
ISA Korean Intellectual Property Office, International Search Report Issued in Application No. PCT/KR2015/003576, Jun. 29, 2015, WIPO, 4 pages.

* cited by examiner

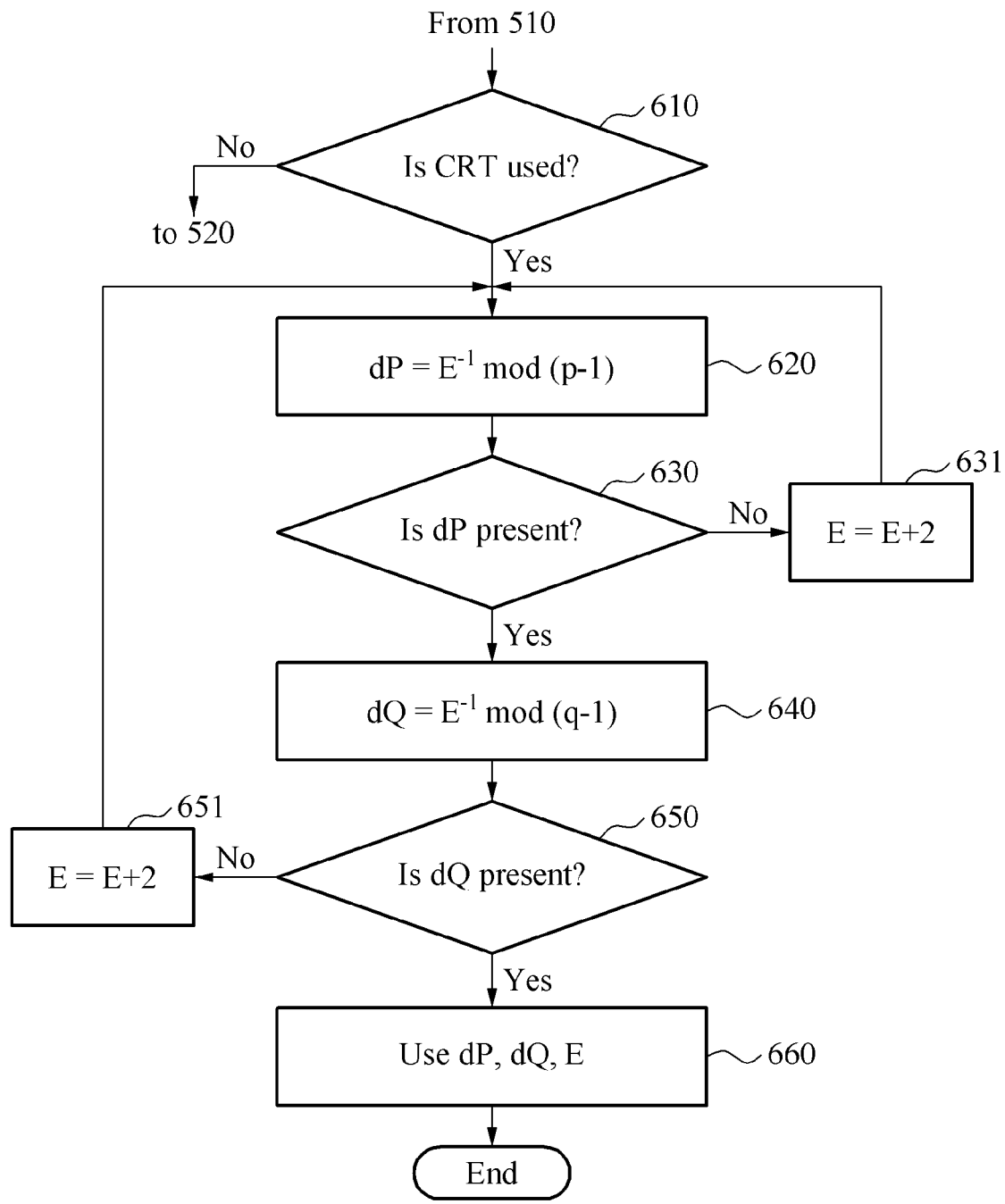

MESSAGE AUTHENTICATION APPARATUS AND METHOD BASED ON PUBLIC-KEY CRYPTOSYSTEMS

CROSS-REFERENCE TO RELATED APPLICATIONS

The present application is a U.S. National Phase of International Patent Application Serial No. PCT/KR2015/003576, entitled "AUTHENTICATION APPARATUS AND METHOD," filed on Apr. 9, 2015. International Patent Application Serial No. PCT/KR2015/003576 claims priority to Korean Patent Application No. 10-2014-0042360, filed on Apr. 9, 2014; and to Korean Patent Application No. 10-2015-0050155, filed on Apr. 9, 2015. The entire contents of each of which are hereby incorporated by reference in their entirety for all purposes.

TECHNICAL FIELD

The present invention relates to an authentication apparatus and method, and more particularly, to an authentication apparatus based on an algorithm of public-key cryptosystems that enhances robustness against a security attack.

BACKGROUND ART

A signature technique using an algorithm of public-key cryptosystems may be used for device authentication or electronic message signature authentication. For example, a Rivest Shamir Adleman (RSA) algorithm is used for an internet encoding and authenticating method of performing encoding and decoding by creating a public key and a private key as a set. The private key is stored in a device, and the public key is transmitted and stored in a counterpart device of, for example, a certification authority (CA).

Because a signature may be forged when a private key using the algorithm of public-key cryptosystems such as the RSA algorithm is exposed/leaked, the private key may be targeted by a security attack, for example, a side channel attack. Among types of side channel attacks, a differential power analysis (DPA) attack that statistically analyzes and collects a large volume of data may be powerful.

A physically unclonable function (PUF) may provide an unpredictable digital value. Individual PUFs may provide different digital values, even though the individual PUFs are manufactured through the same exact manufacturing process. The PUF may be referred to as a "physical one-way function (POWF)" that is practically unclonable.

The above mentioned unclonable aspect of the PUF may be used to generate an identifier of a device for security and/or authentication. For example, the PUF may be used to provide a unique key to distinguish devices from one another.

Korean Patent Registration No. 10-1139630 (hereinafter, referred to as "'630 patent") proposes a method of implementing a PUF. The '630 patent discloses a method of determining based on probability whether an inter-layer contact or a via is generated between conductive layers of a semiconductor, based on a semiconductor process variation.

DISCLOSURE OF INVENTION

Technical Solutions

An aspect of the present invention provides an authentication apparatus and method that is robust against a side channel attack. For example, the authentication apparatus and method may make a differential power analysis (DPA) attack impossible and meaningless based on an algorithm of public-key cryptosystems. For example, a public key-private key pair may be instantly generated and used when authentication is required without the need to repeatedly use the public key-private key pair as a fixed value.

According to an aspect of the present invention, there is provided an authentication apparatus including at least one processor, the apparatus for performing an authentication process based on an algorithm of public-key cryptosystems, for example, an asymmetric keys encryption (RSA) algorithm, the apparatus including a generator to generate a first instant public key in response to a request for an electronic signature corresponding to the algorithm, a calculator to calculate a first instant private key to be paired with the first instant public key in the algorithm using the first instant public key, and a processing unit to generate the electronic signature based on the algorithm using the first instant private key. The generator, the calculator, and the processing unit may be at least temporarily implemented through the at least one processor. The apparatus may further include a communicator to transmit a message in addition to the electronic signature and the first instant public key to a counterpart apparatus.

The apparatus may store and generate the fixed private key through the algorithm. The fixed private key may be used when generating a fixed public key transmitted to another apparatus in an issuing process and used for signature authentication before the first instant private key is calculated using the first instant public key. For example, the apparatus may further include, but is not limited to, a physically unclonable function (PUF) (not shown) to provide a hardware fingerprint using a semiconductor randomly occurring process variation. For example, a value of the PUF may be directly or indirectly used as a value of the fixed private key. In this example, the fixed private key may be protected from a physical attack because the fixed private key is not required to be directly stored in a memory. It may be strongly guaranteed that the fixed private key is only present in a corresponding apparatus and thus, it may be also guaranteed that a public key-private key pair is not randomly generated in another apparatus. In another example, the value of the PUF may be directly or indirectly used to generate instant public keys. For example, the value of the PUF may be used as a seed value or an original value in a random number generating process. In this example, the value of the PUF may be used as the original value of a random number generating algorithm, and thus an effect, which is that results of a random number generating process performed by each apparatus are independent from each other, and values are different, may be additionally expected.

Meanwhile, a request for retransmission by the counterpart apparatus may be responded to as below. When the request for retransmission is due to a simple communication error, a generated message may be regenerated. However in other cases, when a false signature or an attack is suspected, the first instant public key may be discarded and the electric signature may be regenerated and transmitted by generating a new second instant public key differing from the first instant public key.

Based on a verification that the first instant private key to be paired with the first instant public key is absent in response to a result of the calculating, the generator may generate a second instant public key differing from the first instant public key and the calculator may calculate a second instant private key to be paired with the second instant public key in the algorithm. The generator may provide and determine a number obtained by adding an integer 2 to the first instant public key as the second instant public key instead of performing the random number generating process to generate the second instant public key. The first instant private key calculated by the calculator may include a first dP value and a first dQ value when the algorithm is a Rivest Shamir Adleman-Chinese remainder theorem (RSA-CRT) algorithm and, based on a verification that either one of the first dP value and the first dQ value is absent in response to the result of the calculating, the generator may generate the second instant public key differing from the first instant public key and the calculator may calculate a second dP value and a second dQ value to be paired with the second instant public key in the algorithm.

According to another aspect of the present invention, there is provided an authentication apparatus of, for example, a certification authority (CA), the apparatus including at least one processor, the apparatus for authenticating an electronic signature transmitted by a counterpart apparatus based on an algorithm of public-key cryptosystems, the apparatus including a processing unit to authenticate the electronic signature using a pre-stored fixed public key of the counterpart apparatus and a first instant public key that is instantly generated by the counterpart apparatus and transmitted with the electronic signature.

The apparatus may further include a verifier to verify that the first instant public key is an invalid value when the first instant public key is not an odd number greater than or equal to 3. The processing unit and the verifier may be at least temporarily implemented through the at least one processor.

According to still another aspect of the present invention, there is provided an authentication apparatus including at least one processor, the apparatus including a verifier to verify whether a first instant public key received from a counterpart apparatus is a valid value, and a processing unit to encode data to be transmitted using the first instant public key and a fixed public key of the counterpart apparatus when the first instant public key is the valid value. The verifier and the processing unit may be at least temporarily implemented through the at least one processor. For example, the first instant public key may be, but is not limited to being, generated in the counterpart apparatus based on a random number generating process.

The verifier may verify that the first instant public key is an invalid value when the first instant public key is not an odd number greater than or equal to 3. According to still another aspect of the present invention, there is provided an authentication apparatus including at least one processor, the apparatus for performing an authentication process based on an algorithm of public-key cryptosystems, the apparatus including a generator to generate a first instant public key based on a random number generating process in response to the authentication process to be performed, a calculator to calculate a first instant private key to be paired with the first instant public key in the algorithm using the first instant public key, and a processing unit to decode a message using the first instant private key when the message encoded using the first instant public key and a pre-stored fixed public key of a counterpart apparatus is received from the counterpart apparatus receiving the first instant public key. The generator, the calculator, and the processing unit may be at least temporarily implemented through the at least one processor.

The apparatus may further include a physically unclonable function (PUF) to provide a hardware fingerprint using a randomly occurring process variation. The random number generating process may include a random number generating algorithm using the hardware fingerprint as an original value.

Based on a verification that the first instant private key to be paired with the first instant public key is absent in response to a result of the calculating, the generator may generate a second instant public key differing from the first instant public key and the calculator may calculate a second instant private key to be paired with the second instant public key in the algorithm.

According to still another aspect of the present invention, there is provided a non-transitory computer program stored in a computer-readable storage medium, wherein when the program is executed in a computing device including a processor, the processor includes an instruction set for generating a first instant public key based on a random number generating process in response to a request to generate an electronic signature corresponding to a message, an instruction set for calculating a first instant private key to be paired with the first instant public key using the first instant public key, and an instruction set for generating the electronic signature based on an algorithm of public-key cryptosystems using the first instant private key.

According to still another aspect of the present invention, there is provided a non-transitory computer program stored in a computer-readable storage medium, wherein when the program is executed in a computing device including a processor, the processor includes an instruction set for verifying whether a first instant public key received with a message and an electronic signature from a counterpart apparatus is a valid value, and an instruction set for authenticating the electronic signature using the received first instant public key and a fixed public key of the counterpart apparatus stored in the computing device when the first instant public key is the valid value.

BRIEF DESCRIPTION OF DRAWINGS

FIG. 6 is a flowchart illustrating a process when a private key is absent when a Rivest Shamir Adleman-Chinese remainder theorem (RSA-CRT) algorithm is applied according to an embodiment.

BEST MODE FOR CARRYING OUT THE INVENTION

Figure 1:
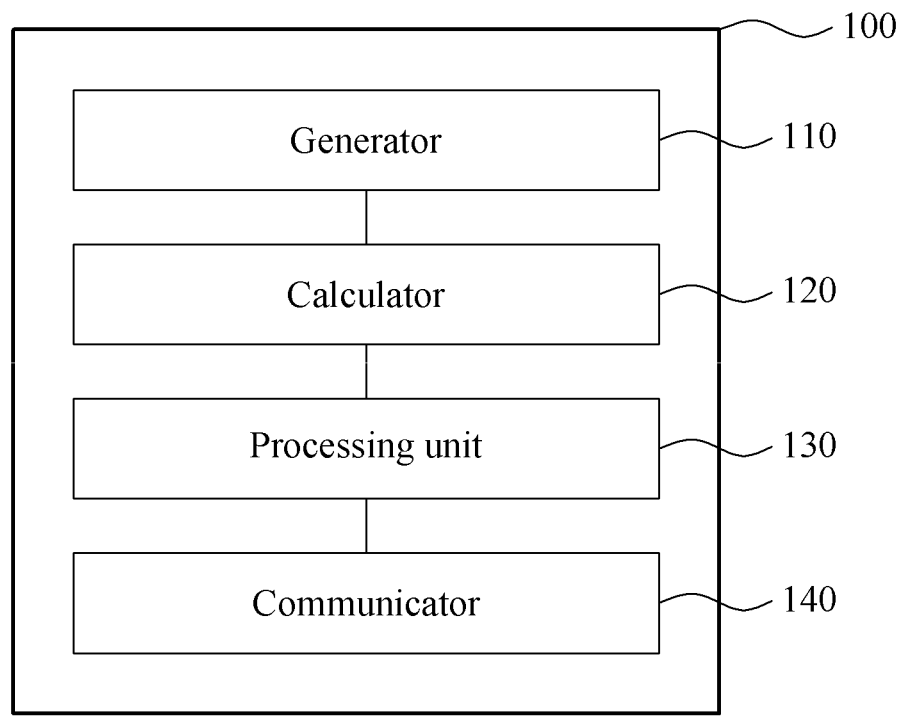
FIG. 1 is a block diagram illustrating an authentication apparatus for providing an instant public key and an instant private key according to an embodiment.

Hereinafter, some embodiments will be described in detail with reference to the accompanying drawings. The scope of the right, however, should not be construed as limited to the embodiments set forth herein. Regarding the reference numerals assigned to the elements in the drawings, it should be noted that the same elements will be designated by the same reference numerals.

Also, terms used herein are selected from general terms being used in the related arts. Yet, the meanings of the terms used herein may be changed depending on a change and/or development of technologies, a custom, or preference of an operator in the art. Accordingly, the terms are merely examples to describe the embodiments, and should not be construed as limited to the technical idea of the present disclosure.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating an authentication apparatus for providing an instant public key and an instant private key according to an embodiment. Hereinafter, an authentication apparatus is also referred to as an apparatus. An apparatus 100 may be at least a portion of a computing terminal including at least one processor. For example, the computing terminal may be, but is not limited to, a smartphone, a tablet, a laptop computer, a general purpose computer, a server, or an encoding communication only terminal. The apparatus 100 may perform an authentication process based on an algorithm of asymmetric-key cryptosystems such as a Rivest Shamir Adleman (RSA) algorithm.

In an example, a generator 110 of the apparatus 100 may generate a first instant public key "E" in response to a request for an electronic signature corresponding to the RSA algorithm. The first instant public key E may be generated based on a random number generating process. The generated first instant public key E is an odd number greater than or equal to 3, because the generated first instant public key E should be a prime number or a pseudo-prime number even when the first instant public key E corresponds to a relatively large number. The generator 110 may verify whether the generated first instant public key E is an odd number and whether the generated first instant public key E is not 1.

In an example, the apparatus 100 may include a physically unclonable function (PUF) (not shown) to provide a hardware fingerprint using a semiconductor randomly occurring process variation. The PUF using the semiconductor process variation may be implemented in various embodiments. For example, the PUF may be implemented using a result indicating whether random formation of inter-layer contacts or vias disposed between conductive layers fails, which has been further described with reference to the '630 patent that is cited in the present disclosure.

In such an example, the hardware fingerprint provided by the PUF may be used for a fixed private key generating algorithm. Each of fixed private keys, p and q in a storage 301, which are basically stored in an apparatus is a prime number. When the fixed private keys are generated, the hardware fingerprint may be used for candidate values of the fixed private keys, p and q. In this example, only a difference between a value of the hardware fingerprint and actually generated values of the fixed private keys, p and q, may be recorded in a memory. A value to be recorded is 32 bits, and thus the value is insufficient for estimating the original fixed private keys, p and q. In addition, it is possible to rapidly reproduce a value of a fixed private key from the value of the hardware fingerprint as needed.

In such an example, the hardware fingerprint provided by the PUF may be used for a random number generating algorithm. The hardware fingerprint may be used as an original value or a seed key required for the random number generating algorithm operating as software and/or hardware.

$$E = \text{random}( )  \quad \text{[Equation 1]}$$

When the first instant public key E is generated using Equation 1, a calculator 120 may calculate a first instant private key "D" to be paired with the first instant public key E, that is, an RSA pair of the first instant public key E, using the first instant public key E based on an algorithm of a calculating method regulated based on the RSA algorithm.

$$D = E^{-1} \bmod (p-1)(q-1) \quad \text{[Equation 2]}$$

There is advantage in instantly generating and calculating a private key-public key being a target of a key issuing process in the RSA algorithm. In the RSA algorithm, there are private keys D, p, and q and public keys E and N to be provided to a counterpart apparatus. Here, N is obtained by multiplying p and q. D and E may have a relationship of D×E=1 mod (p−1)(q−1). Unlike E and N to be transmitted to another apparatus or certification authority (CA), the private keys D, p, and q existing (and should exist) only inside of an authentication apparatus may be targeted by the security attack. When a third person knows the private key D, the electronic signature may be directly forged. Even though the private key D is unknown, RSA encoding may be invalid when the third person knows the private key p and/or the private key q because it is possible to calculate the private key D and the public key E which is open publically.

As described above, a side channel attack, for example, a differential power analysis (DPA) attack, may obtain the private keys D, p, or q using a statistical analyzing method after collecting a number of waveforms obtained by using an actual key in order to analyze a power consumption waveform of an apparatus, unlike a simple power analysis (SPA) attack that analyzes a single current consumption waveform. In an environment when a noise occurs or when it is difficult to observe an amount of power consumption because the amount of power consumption is shielded, the SPA attack may be unsuccessful. Still, the DPA attack is a threat to a safety of an encryption algorithm, because a noise and an outlier may be offset in the statistical analyzing process through the number of waveforms and because a meaningful pattern may be found.

When the conventional RSA encryption algorithm is used, an authentication apparatus has the fixed private keys D, p, and q and the CA being the counterpart has the fixed public keys E and N of the authentication apparatus. Thus, there is a risk because it is possible to collect the number of waveforms required for the DPA attack by repeatedly sending, by an attacker, a request for the electronic signature to an apparatus.

However, at least one D and E of the public keys and the private keys may be dynamically changing values. That is, instantly and temporarily used D and E may be generated when the encryption algorithm is required for the electronic signature. Because the generated D and E are used only one time, the electronic signature may be meaningless to the attacker even when the electronic signature is collected. Thus, embodiments may prevent the side channel attack, for example, the DPA attack, by using and generating the dynamically changing E and D that are not fixed values.

Further, as described above, even when hardware fingerprints of the PUF used for randomly generating the first instant public key E are identically designed, it is impossible to physically reproduce the hardware fingerprints because the hardware fingerprints have different values. In addition, it is nearly impossible to observe and analyze a structure or a value of the PUF from an outside. Thus, an attack on an algorithm that generates the random E using the value of the PUF as the seed key may be prevented.

Thus, the first instant public key E may be generated and the first instant private key D to be paired with the first instant public key E may be calculated using the first instant public key E. However, in certain circumstances, the first instant private key D that satisfies Equation 2 may be absent.

When the first instant private key D is absent, a valid "pair of instant D-instant E" may not be created. Thus, the generator 110 may generate a second instant public key E' differing from the first instant public key E. The calculator 120 may calculate a second instant private key D' using the second instant public key E' based on Equation 2. When the second instant private key D' is present, the second instant public key E' and the second instant private key D' may be used. Otherwise, the foregoing process may be repeated.

Here, the process of generating the second instant public key E' by the generator 110 may involve going through the random number generating process again similar to the process of generating the first instant public key E. However, a simpler process may be also possible. For example, the generator 110 may provide and determine a number (that is, an odd number greater than E) obtained by adding an integer 2 to the first instant public key E as the second instant public key E' in which the generated private key D corresponding to the first instant public key E is absent, instead of performing the random number generating process. The integer "2" to be added to the first instant public key E for generating the second instant public key E' is only indicated as an example, and may be changed to a different value. Description of regeneration of the first instant public key E based on whether the private key D is present will be provided with reference to FIG. 5.

The encryption algorithm may be an algorithm using the Chinese remainder theorem (CRT). In this case, an instant private key to be calculated using the first instant public key E may not be the single private key D but may be dP or dQ calculated using Equations 3 and 4.

$$dP = E^{-1} \bmod (p-1) \quad \text{[Equation 3]}$$

$$dQ = E^{-1} \bmod (p-1) \quad \text{[Equation 4]}$$

In an example of the RSA-CRT algorithm, based on a verification that either one of the valid value dP and the valid dQ value corresponding to the first instant public key E is absent based on a calculation of the calculator 120, the first instant public key E should be regenerated. In this case, the random number generating process may be performed again, but the second instant public key E may be simply determined by adding the integer 2 to the first instant public key E and the value dP and the dQ value corresponding to the second instant public key E may be also calculated. Detailed description will be provided with reference to FIG. 6.

When the valid first instant public key E and the instant private key D or dP, and dQ are determined through the aforementioned process, the RSA algorithm may be performed. When a message M is signed and an electronic signature S is generated, a processing unit 130 may perform a process described below.

$$S = \text{GenSign}(M, D, p, q) \quad \text{[Equation 5]}$$

GenSign( ) is an electronic signature generating function, and may be regulated based on the RSA algorithm. A communicator 140 may transmit the generated electronic signature S and the message M to a counterpart apparatus of, for example, the CA, in addition to the generated instant public key E, unlike the conventional method. Subsequently, the counterpart apparatus may authenticate the electronic signature S using the instant public key E and a pre-stored fixed public key N of the apparatus 100. The foregoing process will be described with reference to FIG. 3.

When the counterpart apparatus encodes and transmits a message using the transmitted instant public key E, the apparatus 100 may decode the message using the stored instant private key D (or dP and dQ) with p and q. Such process will be described with reference to FIG. 4.

Even though a risk of a security attack may decrease, a risk of other predictable attacks may exist. An attacker may request retransmission of a key a number of times in a short period of time. The apparatus 100 may retransmit the generated key in lieu of regenerating a signature by reusing an instant private key when a communication error occurs. When an error is not the communication error, the generated instant public key may be discarded and a new instant public key may be generated. Whether the error is the communication error may be verified based on whether a communication acknowledgement (ACK) with respect to a transmission message is received. Attack prevention methods to be performed by the counterpart apparatus will be described with reference to FIG. 2.

Figure 2:
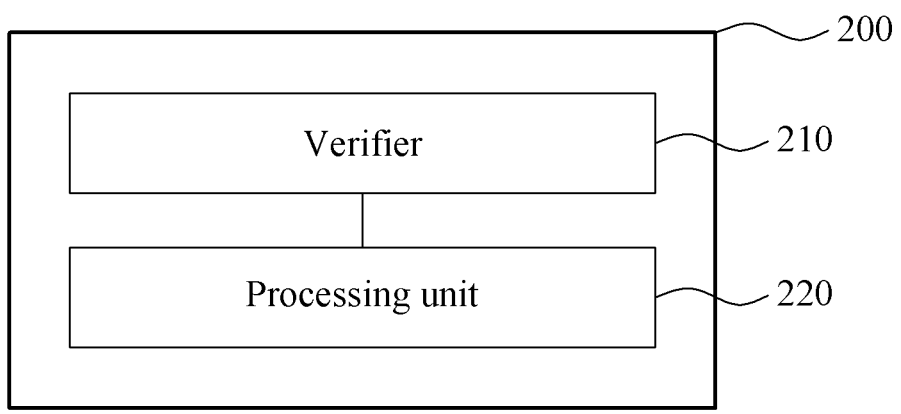
FIG. 2 is a block diagram illustrating an authentication apparatus receiving and using an instant public key generated by a counterpart according to an embodiment.

FIG. 2 is a block diagram illustrating an authentication apparatus receiving and using an instant public key generated by a counterpart apparatus according to an embodiment. An apparatus 200 may be an apparatus of a certification authority (CA). The apparatus 200 may be at least a portion of a computing device including at least one processor, and a verifier 210 and a processing unit 220 may be temporarily implemented by the processor.

The apparatus 200 may include the processing unit 220 to authenticate an electronic signature S using a pre-stored fixed public key N of the counterpart apparatus and a first instant public key E instantly generated by the counterpart apparatus and transmitted with a message, for example, data M, and an electronic signature S, as described with reference to FIG. 1.

When a message is encoded and transmitted to the counterpart apparatus, the processing unit 220 may encode the data M to be transmitted using the received first instant public key E and the pre-stored fixed public key N of the counterpart apparatus. When data M' obtained by encoding the data M normally is transmitted to the counterpart apparatus, the counterpart apparatus may decode the data M' to the data M using an instant private key D (or dP and dQ) and fixed private keys p and q of the counterpart apparatus.

The apparatus 200 may further include the verifier 210 to verify whether the instant public key E transmitted by the counterpart apparatus is a valid value. It may be supposed that during an attack an attacker generates the instant public key E and the instant private key D to be 1 to generate and transmit an electronic signature. In this case, electronic signature generation and verification may not be properly performed. Because the instant public key E and the instant private key D are used as exponential values in RSA calculation, calculating a message "1" squared for performing encoding-decoding may be identical to calculating nothing when values of the instant public key E and the instant private key D correspond to 1. From a standpoint of the CA, a result of signature authentication seems to be valid. Thus, to prevent such circumstance, the verifier 210 may verify whether the instant public key E transmitted from the counterpart apparatus is an odd number greater than or equal to 3. When the instant public key E is an even number or the instant public key E is 1, the instant public key E may be verified to be an invalid value.

Further, when the instant public key E is repeatedly used a number of times greater than or equal to a predetermined number of reuse times, the verifier 210 may verify that this is an abnormal situation and that the instant public key E is the invalid value.

Figure 3:
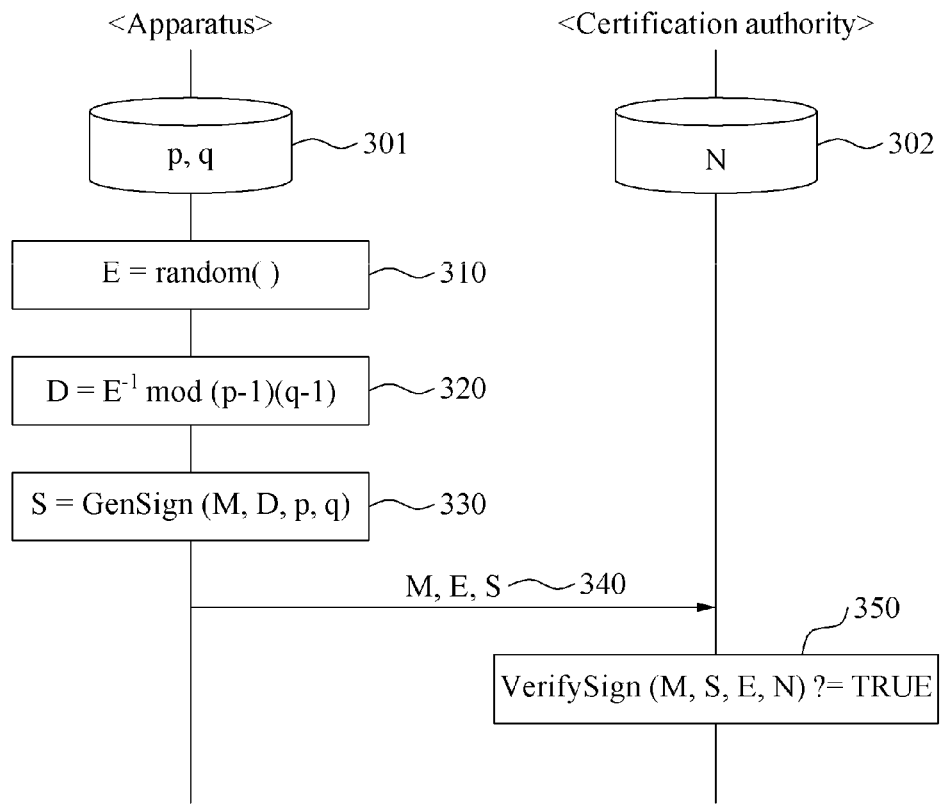
FIG. 3 is a flowchart illustrating an electronic signature authenticating process according to an embodiment.

FIG. 3 is a flowchart illustrating an electronic signature authenticating process according to an embodiment. As described above, unlike the conventional RSA algorithm, an apparatus may not have a fixed private key D and a counterpart CA may also not have a fixed public key E of the apparatus. Thus, the instant public key E and the instant private key D calculated using the instant public key E may be generated and used when authentication is required, as described above with reference to FIGS. 1 and 2.

The apparatus only has p and q in the storage 301. The CA only has N of fixed public keys of the apparatus. When the authentication is required, operation 310 is performed. Operation 310 is a process in which the random instant public key E is generated through a random number generating process, and the generated instant public key E is an odd number greater than or equal to 3. Description of generation and validity authentication of the instant public key E is provided above with reference to FIG. 1.

Subsequently, in operation 320, D being an RSA pair of the instant public key E is calculated. One of ordinary skill in the art may easily understand calculation of D because D is calculated based on a calculating method regulated based on the RSA algorithm. In operation 330, an electronic signature S for a message M to be transmitted is generated. In operation 340, the message M, the instant public key E, and the electronic signature S are transmitted to the CA. In operation 350 in which an electronic signature authenticating algorithm is performed, the CA uses a pre-stored N and transmitted E. Before operation 350 is performed, the CA may perform a process of verifying whether the transmitted E is a valid value. Description of the process of verifying is provided above with reference to FIG. 2.

Figure 4:
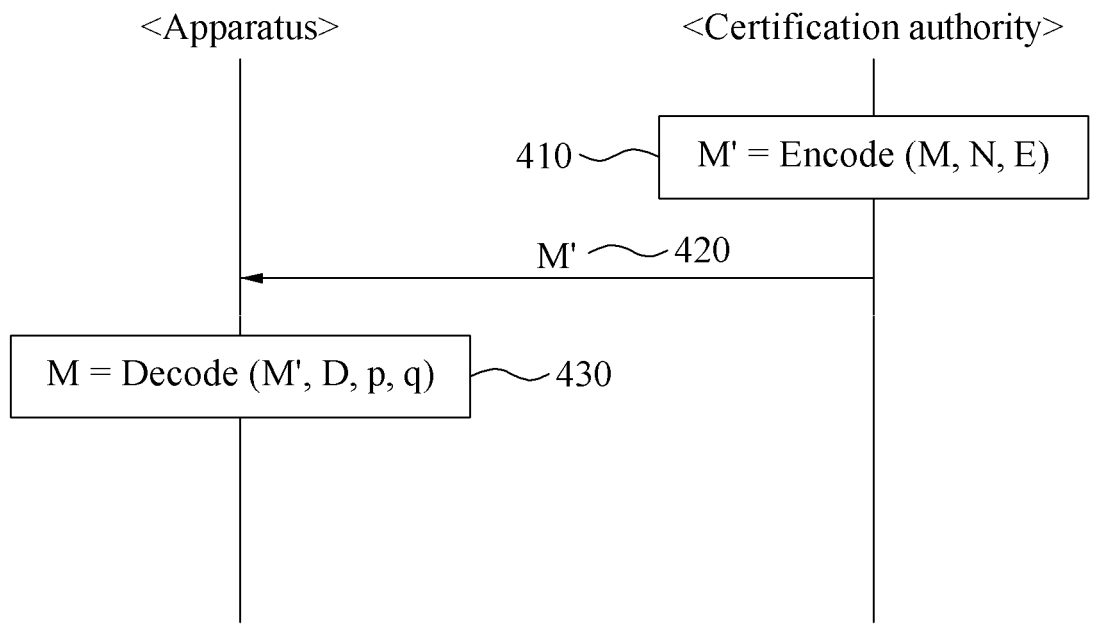
FIG. 4 is a flowchart illustrating an encoding process and a decoding process according to an embodiment.

FIG. 4 is a flowchart illustrating an encoding process and a decoding process according to an embodiment. FIG. 4 illustrates a process in which a CA encodes a message M and transmits the message M to an apparatus. In operation 410, the CA encodes data, for example, the message M, to be transmitted using a pre-stored fixed public key N of a counterpart apparatus and an instant public key E which is transmitted in advance. In operation 420, an encoded message M' is transmitted to the apparatus, and the apparatus may decode the encoded message M' to the message M using fixed private keys p and q of the apparatus and the instant private key D (or dP and dQ).

Figure 5:
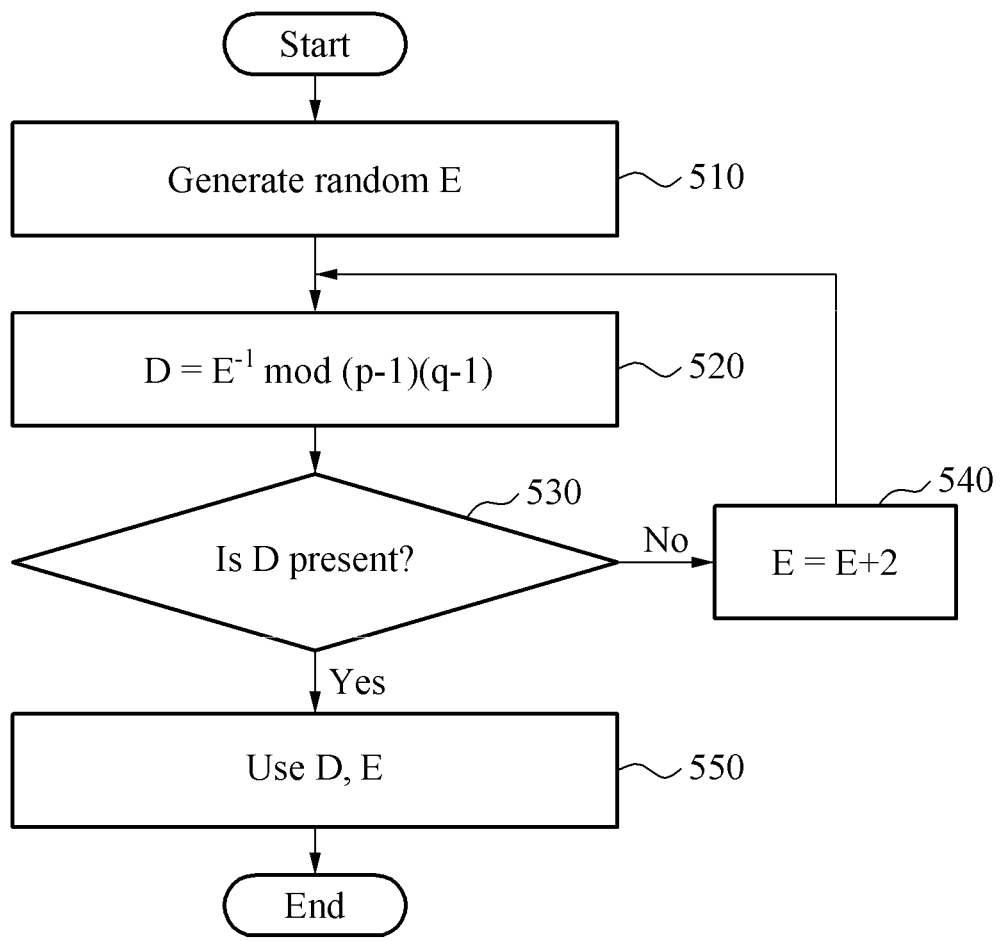
FIG. 5 is a flowchart illustrating a process when an instant private key is absent according to an embodiment.

FIG. 5 is a flowchart illustrating a process when an instant private key is absent according to an embodiment. In operation 510, a generator of an apparatus generates an instant public key E based on a random number generating process. In operation 520, a calculator of the apparatus calculates an instant private key D being an RSA pair of the instant public key E based on the instant public key E using Equation 2. In operation 530, when the valid instant public key D is present, an authentication process using the instant private key D and the instant public key E is performed as described above with reference to FIGS. 1 through 4.

However, based on a verification that the instant private key D is absent, a generator of the apparatus may generate a second instant public key E' differing from the instant public key E. Such process may involve going through the random number generating process again, but the simpler example is suggested by FIG. 5. In operation 540, an integer 2 is added to the instant public key E which is unusable because the instant private key D is absent even though the instant private key D is generated. Such process may be repeated until a valid E-D pair is present.

FIG. 6 is a flowchart illustrating a process when a private key is absent when a Rivest Shamir Adleman-Chinese remainder theorem (RSA-CRT) algorithm is applied according to an embodiment. Comparison between a case in which a signature is generated without using a CRT algorithm and a case in which a signature is generated using the CRT algorithm is as shown in Table 1.

TABLE 1

| Case in which CRT is not used | Case in which CRT is used |
| --- | --- |
| $D = E^{-1} \bmod (p-1)(q-1)$ <br> $N = pq$ <br> $S = M'^{D} \bmod N$ | $dP = E^{-1} \bmod (p-1)$ <br> $dQ = E^{-1} \bmod (q-1)$ <br> $qInv = q^{-1} \bmod p$ <br> $s_1 = M'^{dP} \bmod p$ <br> $s_2 = M'^{dQ} \bmod q$ <br> $h = qInv \times (s_1 - s_2) \bmod p$ <br> $S = s_2 + h \times q$ |

In Table 1, M" is a value obtained by adding a padding to a hash value of a message M in response to an RSA signature format. As verified by Table 1, equations may be complex when the CRT algorithm is used, but a length of a data process of "modular exponentiation" that requires a great amount of RSA calculation may be reduced by half. Thus, a speed of the calculation may be four times through eight times faster than when the CRT algorithm is not used.

After the random instant public key E is generated, dP is calculated in operation 620 based on a verification that the CRT algorithm is used in operation 610, and it is verified that dP is present in operation 630. Regardless of whether dQ is present, E may not be used when dP is absent. Thus, a process of assigning a number obtained by adding 2 to the instant public key E as the instant public key E again and calculating dP in operation 631 may be repeated until dP is present. As described above, operation 631 is only a selective example and thus a completely new E may be possibly regenerated through the random number generating process.

When dP is present, a same process may be repeated with respect to dQ. Descriptions on operations 620, 630, and 631 may be also applicable to operation 640 of calculating dQ, operation 650 of verifying whether dQ is present, and operation 651 of regenerating E when dQ is absent. When valid dP and dQ are all present, an encryption algorithm using the CRT algorithm may be performed in operation 660.

An issue of performance and effect according to aforementioned embodiments will be described briefly. An external attack may be impossible when a random number generating method using a PUF hardware fingerprint as an original value is used. Even when a pair of E and D is regenerated and used, an identical pair of E and D may be coincidentally used when E is too small (for example, less than 16 bits). However, this may be prevented by slightly increasing a value of E. When the value of E increases, a calculation amount required for authenticating an electronic signature may increase. However, such increasing calculation amount may not be a burden considering hardware resources of a CA that performs such calculation. Thus, the value of E may be determined to be a sufficiently large value, for example, a value greater than or equal to 128 bits, as long as performance does not deteriorate.

Performance deterioration occurring because an E-D pair is continuously regenerated may not be great. A time complexity of the calculation that generates the E-D pair may be proportional to a length n of a key (time complexity O(n)), and signature generating calculation may be proportional to a square or a cube of the length n of the key based on an implementation method (time complexity $O(n^2)$ or $O(n^3)$). Because a minimum length of a key of a recently used RSA algorithm is greater than or equal to 1024 bits and 2048 bits, the calculation time used for generating the E-D pair may be one of thousands of minutes of time used for generating the signature. Such amount of time may be too small to ignore the importance of the time in general. Thus, a side channel attack, for example, a DPA, may be prevented without performance deterioration or an overuse of hardware.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An authentication apparatus comprising at least one processor, the authentication apparatus for performing an authentication process based on an algorithm of public-key cryptosystems, and the authentication apparatus at least temporarily implemented through the at least one processor, the authentication apparatus comprising:
a generator storing instructions executable by the at least one processor to generate a random first instant public key for a message in response to a request for an electronic signature corresponding to the algorithm;
a calculator storing instructions executable by the at least one processor to calculate a first instant private key based on the first instant public key and the algorithm, the first instant private key to be paired with the first instant public key in the algorithm; and
a processing unit storing instructions executable by the at least one processor to generate the electronic signature based on the algorithm using the first instant private key and further based on the message;
wherein the first instant public key is instantly and temporarily generated for the authentication process such that a second instant public key will be different from the first instant public key, and each instant private key is calculated based on a correspondingly generated instant public key.

2. The authentication apparatus of claim 1, further comprising:
a communicator storing instructions executable by the at least one processor to transmit the message in addition to the electronic signature and the first instant public key to a counterpart apparatus.

3. The authentication apparatus of claim 2, wherein, in response to a request of retransmission being received from the counterpart apparatus, the generator generates the second instant public key based on a verification that a communication error is absent in response to a communication acknowledgement (ACK) being received.

4. The authentication apparatus of claim 1, wherein the generator generates the first instant public key based on a random number generating process.

5. The authentication apparatus of claim 4, further comprising:
a physically unclonable function (PUF) to provide a hardware fingerprint using a randomly occurring process variation;
wherein the random number generating process includes a random number generating algorithm using the hardware fingerprint as an original value.

6. The authentication apparatus of claim 4, wherein, based on a verification that the first instant private key to be paired with the first instant public key is absent in response to a result of the calculating, the generator generates the second instant public key and the calculator calculates a second instant private key to be paired with the second instant public key in the algorithm.

7. The authentication apparatus of claim 6, wherein the generator provides and determines a number obtained by adding an integer of 2 to the first instant public key as the second instant public key instead of performing the random number generating process to generate the second instant public key.

8. The authentication apparatus of claim 6, wherein the first instant private key calculated by the calculator includes a first dP value and a first dQ value when the algorithm is a Rivest Shamir Adleman-Chinese remainder theorem (RSA-CRT) algorithm and, based on a verification that either one of the first dP value and the first dQ value is absent in response to the result of the calculating, the generator generates the second instant public key differing from the first instant public key and the calculator calculates a second dP value and a second dQ value to be paired with the second instant public key in the algorithm.

9. An authentication apparatus, the authentication apparatus including at least one processor, the authentication apparatus for authenticating an electronic signature transmitted by a counterpart apparatus based on an algorithm of public-key cryptosystems, and the authentication apparatus at least temporarily implemented through the at least one processor, the authentication apparatus comprising:
a processing unit storing instructions executable by the at least one processor to authenticate the electronic signature of a message using a pre-stored fixed public key of the counterpart apparatus and a first instant public key that is instantly generated by the counterpart apparatus responsive to a request for the electronic signature for the message and transmitted with the electronic signature;
wherein the processing unit stores further instructions to calculate instant private keys based on each generated instant public key;
wherein the first instant public key is instantly and temporarily generated for an authentication process such that a second instant public key will be different from the first instant public key.

10. The authentication apparatus of claim 9, further comprising:
a verifier storing instructions executable by the at least one processor to verify that the first instant public key is an invalid value when the first instant public key is not an odd number greater than or equal to 3.

11. The authentication apparatus of claim 9, further comprising:

a verifier storing instructions executable by the at least one processor to verify that the first instant public key is an invalid value when the first instant public key is repeatedly generated.

12. An authentication apparatus comprising at least one processor, the authentication apparatus at least temporarily implemented through at the least one processor, the authentication apparatus comprising:
- a verifier storing instructions executable by the at least one processor to verify whether a first instant public key received from a counterpart apparatus is a valid value, wherein the first instant public key is generated for a message by the counterpart apparatus in response to a request for an electronic signature; and
- a processing unit storing instructions executable by the at least one processor to encode data to be transmitted using the first instant public key and a fixed public key of the counterpart apparatus when the first instant public key is the valid value, and the processing unit storing further instructions to calculate instant private keys based on each generated instant public key;
- wherein the first instant public key is instantly and temporarily generated for an authentication process such that a second instant public key will be different from the first instant public key.

13. The authentication apparatus of claim 12, wherein the first instant public key is generated in the counterpart apparatus based on a random number generating process.

14. The authentication apparatus of claim 12, wherein the verifier verifies that the first instant public key is an invalid value when the first instant public key is not an odd number greater than or equal to 3.

15. The authentication apparatus of claim 12, wherein the verifier verifies that the first instant public key is an invalid value when the first instant public key is repeatedly used a number of times greater than or equal to a predetermined number of reuse times.

* * * * *

UNITED STATES PATENT AND TRADEMARK OFFICE
CERTIFICATE OF CORRECTION

PATENT NO.        : 10,659,232 B2
APPLICATION NO.   : 15/302947
DATED             : May 19, 2020
INVENTOR(S)       : Dong Kyue Kim et al.

Page 1 of 1

It is certified that error appears in the above-identified patent and that said Letters Patent is hereby corrected as shown below:

On the Title Page

Item (73), at Line 2, insert --IUCF-HYU (INDUSTRY-UNIVERSITY COOPERATION FOUNDATION HANYANG UNIVERSITY), SEOUL, REPUBLIC OF KOREA--

Signed and Sealed this
Twenty-ninth Day of September, 2020

Andrei Iancu
*Director of the United States Patent and Trademark Office*